US007129008B2

(12) United States Patent  
Burzynski et al.

(10) Patent No.: US 7,129,008 B2  
(45) Date of Patent: *Oct. 31, 2006

(54) HOLOGRAPHIC RECORDING MATERIAL

(75) Inventors: Ryszard Burzynski, Kenmore, NY (US); Deepak N. Kumar, Sunnyvale, CA (US); Saswati Ghosal, King of Prussia, PA (US); Dale R. Tyczka, Collegeville, PA (US)

(73) Assignee: Laser Photonics Technology Inc., W. Amherst, NY (US)

( * ) Notice: Subject to any disclaimer, the term of this patent is extended or adjusted under 35 U.S.C. 154(b) by 224 days.

This patent is subject to a terminal disclaimer.

(21) Appl. No.: 10/460,334

(22) Filed: Jun. 12, 2003

(65) Prior Publication Data

US 2004/0033423 A1    Feb. 19, 2004

Related U.S. Application Data

(63) Continuation-in-part of application No. 09/993,973, filed on Nov. 16, 2001, now abandoned, which is a continuation of application No. 09/415,984, filed on Oct. 12, 1999, now Pat. No. 6,344,297.

(51) Int. Cl.
    *G03H 1/04* (2006.01)
(52) U.S. Cl. .................... 430/1; 480/2; 359/3
(58) Field of Classification Search ............... None
    See application file for complete search history.

(56) References Cited

U.S. PATENT DOCUMENTS

| 2,951,758 | A |   | 9/1960  | Notley |
| 3,658,526 | A |   | 4/1972  | Haugh |
| 4,047,963 | A | * | 9/1977  | Simpson ............... 430/280.1 |
| 4,145,216 | A |   | 3/1979  | Merrill et al. |
| 4,239,849 | A | * | 12/1980 | Lipson et al. ............ 430/281.1 |
| 4,286,048 | A |   | 8/1981  | Merrill et al. |
| 4,815,800 | A |   | 3/1989  | Chern et al. |
| 4,959,283 | A |   | 9/1990  | Smothers et al. |
| 4,983,003 | A |   | 1/1991  | Wreede et al. |
| 5,260,149 | A |   | 11/1993 | Monroe et al. |
| 5,500,912 | A |   | 3/1996  | Alonas et al. |
| 5,684,101 | A | * | 11/1997 | Muir et al. ................ 526/172 |
| 5,707,773 | A |   | 1/1998  | Grossman et al. |
| 5,874,187 | A | * | 2/1999  | Colvin et al. .................. 430/2 |
| 6,066,378 | A |   | 5/2000  | Morii et al. |
| 6,160,645 | A | * | 12/2000 | Chandross et al. ............ 359/3 |
| 6,344,297 | B1 |  | 2/2002  | Burzynski et al. |
| 6,703,139 | B1 | * | 3/2004 | Ogawa et al. .............. 428/500 |

FOREIGN PATENT DOCUMENTS

| CA | 1 224 182   | 7/1987  |
| JP | 61-243807   | 10/1986 |
| WO | WO 97/10527 | 3/1997  |
| WO | WO 98/12607 | 3/1998  |

OTHER PUBLICATIONS

Veniaminov et al., "Polymer and dye probe diffusion in poly(methyl methacrylate) below the glass transition . . . " Macromol. vol. 32 pp. 1828-1837 (1999).*

(Continued)

*Primary Examiner*—Martin Angebranndt  
(74) *Attorney, Agent, or Firm*—Hodgson Russ LLP (57) ABSTRACT

New photosensitive acrylic material compositions for fabrication of holographic recording materials (HRMs) are provided. These compositions are comprised of polymerizable acrylic monomers and light absorbing dyes, and when polymerized they are thermally stable, light sensitive, hard and inert to common chemicals. Methods of fabricating HRMs with symmetric concentration distribution of the dye are also provided.

19 Claims, 3 Drawing Sheets

OTHER PUBLICATIONS

Bains—"Researchers on Both Coasts Eye Hologram Recording Scheme—Material Raises Hopes for Tbyte Storage"—EETIMES (Jun. 15, 1998) Issue 1012, pp. 1-4.

Barbastathis, "Shift Multiplexed Holographic 3D Disks"—sunoptics.caltech.edu/~george/shift_multiplexing.html (Aug. 26, 1998) pp. 1-4.

Brinker et al.—"Sol-Gel Science: The Physics and Chemistry of Sol-Gel Processing"—(1990) pp. 130-151.

Burzynski et al.—"New Photopolymer for Holographic Optical Storage Technology"—SPIE (2000) vol. 4087, pp. 741-753.

Ludman et al.—"Holographic Nonspatial Filter"—SPIE (1995) vol. 2532, pp. 481-490.

Mendez-Vivar et al.—"Si NMR Study of Hydrolyzed TEOS-RTEOS (R: Methyl, Ethyl, Phenyl) Systems"—Organic/Inorganic Hybrid Materials (Symposium held Apr. 13-17, 1998, San Francisco, CA, USA) pp. 163-168.

Popov et al.—"Apodization of Volume Holograms by Diffusion of Organic Molecules in a Polymer"—Opt. Spectrosc. (Sep. 1991) vol. 71, No. 3, pp. 295-296.

Popov et al.—"Photochemical and Diffusional Apodization of High-Efficiency Thick Phase Holograms"—SPIE (1994) vol. 2215, Photonics for Space Environments II, pp. 64-71.

Steckman—"Polymer Based Recording Materials"—optics.caltech.edu/steckman/Polymer/Polymer.html (May 8, 1998) pp. 1-2.

Steckman—"PQ Doped PMMA"—optics.caltech.edu/steckman/Polymer/PMMA_PQ/PMMA_PQ.html (May 8, 1998) p. 1.

Steckman et al.—"Characterization of Phenanthrenequinone-Doped Poly(Methyl Methacrylate) for Holographic Memory"—Optics Letters (Aug. 15, 1998) vol. 23, No. 16, pp. 1310-1312.

Veniaminov et al.—"Hologram Amplification by Diffusion Destruction of Out-of-Phase Periodic Structures"—Opt. Spectrosc. (Apr. 1991) vol. 70, pp. 505-508.

Veniaminov et al.—"Polymer and Dye Probe Diffusion in Poly(Methyl Methacrylate) Below the Glass Transition Studied by Forced Rayleigh Scattering"—Macromolecules (1999) vol. 32, pp. 1828-1837.

* cited by examiner

HOLOGRAPHIC RECORDING MATERIAL

This application is a continuation-in-part of U.S. application Ser. No. 09/993,973, filed Nov. 16, 2001, now abandoned which is a continuation of U.S. application Ser. No. 09/415,984, filed Oct. 12, 1999, now U.S. Pat. No. 6,344,297, issued Feb. 5, 2002. The disclosure of each is incorporated by reference herein.

BACKGROUND

The fundamental aspect of an HRM is to utilize a photochemical phenomenon wherein the light harvesting dye absorbs light, reacts with the polymerized matrix, and alters the index of refraction. These induced refractive index modulations result in phase holograms with high diffraction efficiency and wavelength and angular selectivity. The covalent reaction of the light harvesting dye with poly(methyl methacrylate) is known (See, for example, A. V. Veniaminov and H. Sillescu, *Macromolecules*, 32, 1828–1837, 1999). Previous HRMs are well known, but the HRM closest to the subject invention is limited to a poly(methyl methacrylate) (PMMA) polymer and a light harvesting dye, 9,10-phenanthrenequinone composite.

For example, A. Popov et al. (A. P. Popov, A. V. Veniaminov, Y. N. Sedunov, *SPIE*, 2215, 64, 1994) describe a general method of fabricating a 6 to 8 mm thick HRM having a gradient distribution of the 9,10-phenanthrenequinone dye in the PMMA matrix across the material's thickness.

This variation of the dye concentration as taught by Popov et al., is achieved by exposing each surface to a mercury lamp light filtered in such a way that the transmission maximum coincides with having a wavelength within the absorption profile of 9,10-phenanthrenequinone dye. As the light propagates through the HRM, its intensity falls exponentially with the penetration depth in accordance with the Lambert-Beer law. The accompanying photoinduced effect, a reaction between the dye and the polymer matrix, decreases. Thereby, unreacted dye is located toward the center of the HRM's cross-section.

In the same publication, Popov et al. describe another method of fabricating a thick HRM with a gradient distribution of the 9,10-phenanthrenequinone dye in a PMMA matrix. In this method, the initial 100 micrometers thick layer of PMMA polymer is doped with 10 wt % of 9,10-phenanthrenequinone, which was prepared from a dichloroethane solution. The dried film was then placed between two 3 mm thick pure PMMA slabs and the entire assembly pressed together and heated to accelerate dye diffusion from the center layer to outside layers. The diffusion into the PMMA slabs depends on the temperature. In most instances, the elevated temperature necessary to achieve reasonable diffusion rates exceeds the PMMA's glass transition temperature. Obviously, this result is not desired.

Likewise, B. Ludman et al. (J. E. Ludman, N. O. Reinhard, I. V. Semenova, Yu. L. Korzinin, and S. M. Shahriar, *SPIE*, 2532, 481, 1995) describe the use of an HRM consisting of 0.5 to 5 wt % of 9,10-phenanthrenequinone in a PMMA matrix. This HRM has similar problems of Popov et al.

Similarly, C. Steckman et al. (G. J. Steckman, I. Solomatine, G. Zou and D. Psaltis, *Opt. Lett.*, 23, 1310, 1998) describe the preparation of a 1 to 5 mm HRM comprising 0.7 wt % of 9,10-phenanthrenequinone dye dissolved in a PMMA matrix. To prepare such material, a solution of the dye, a polymerization initiator, and methyl methacrylate, is poured into molds and allowed to polymerize in a pressure chamber at elevated temperatures.

A problem with these prior references is that the PMMA has a relatively low glass transition which can lead to distortions after light exposure. Another problem is that post exposure treatment at elevated temperatures (around and above the glass transition temperature), significantly reduces the photoinduced index modulation by the diffusion of the photoproducts and, consequently, the strength of the holograms substantially decreases. Another problem relates to the low number of reactive sites in the polymer matrix during holographic recording. Yet another problem involves the limited chemical inertness of the PMMA matrix toward common chemical agents such as alcohols, acetone, chloroform, benzene and others.

SUMMARY

The problems of these references can be solved with the present invention. The present invention provides high optical quality HRMs with high holographic storage capacity, thermal stability at elevated temperatures, and hardness and inertness toward chemical agents. The present invention is directed to an HRM having a polymer matrix of at least two distinct acrylate materials and a light harvesting dye. Upon photoexcitation, the light harvesting dye reacts with the polymer matrix changing its molecular polarizability and, thus, the average index of refraction of the exposed regions. Along with this composition, the present invention is directed to a new method of producing HRM with gradient distribution of the light harvesting dye. This new method results in a HRM with better angular selectivity and optical quality (low scattering).

DETAILED DESCRIPTION

The present invention is an HRM having at least two distinctive acrylate materials and a light harvesting dye, wherein the acrylate materials are polymerized and the dye reactively bonds with the polymerized acrylate material upon photoexcitation. The term "distinctive" means the acrylate material has a secondary carbon chain of a different length. Moreover, each acrylate material is a monomer represented by the structural formulas 1 to 5.

Formula 1 has the following structure:

wherein R'=H; or an alkyl group, substituted or unsubstituted, having 1 to 8 carbon atoms; or an aryl group, substituted or unsubstituted, having 4 to 20 carbon atoms; and n=0 to 8, and when X is present
X is S or O, and
R=an alkyl group, substituted or unsubstituted, having 1 to 8 carbon atoms; or an aryl group, substituted or unsubstituted, having 4 to 20 carbon atoms.

Formula 2 has the following structure:

wherein R=an alkyl group, substituted or unsubstituted, having 1 to 8 carbon atoms; or an aryl group, substituted or unsubstituted, having 4 to 20 carbon atoms; and
$R_1''$ and $R_2''$ independently=—OC(=O)C($R_3$)=CH$_2$ or H wherein $R_3$=H; or an alkyl group, substituted or unsubstituted, having 1 to 8 carbon atoms; or an aryl group, substituted or unsubstituted, having 4 to 20 carbon atoms.

Formula 3 has the following structure:

wherein R=a tri- or tetra-substituted aryl group; or a carbon atom;
R'=H; or an alkyl group, substituted or unsubstituted, having 1 to 8 carbon atoms; or an aryl group, substituted or unsubstituted, having 4 to 20 carbon atoms; and
$R_1$, $R_2$, and $R_3$ independently=—OC(=O)C($R_4$)=CH$_2$ or H wherein $R_4$=H; an alkyl group, substituted or unsubstituted, having 1 to 8 carbon atoms; or an aryl group, substituted or unsubstituted, having 4 to 20 carbon atoms.

Formula 4 has the following structure:

wherein R=a tri- or tetra-substituted aryl group; or a carbon atom;
R'=H; or an alkyl group, substituted or unsubstituted, having 1 to 8 carbon atoms; or an aryl group, substituted or unsubstituted, having 4 to 20 carbon atoms;
$R_1'=R_2'=R_3'$=—CH$_2$CH$_2$— or —CH$_2$CH$_2$CH$_2$—, and
$R_4'=R_5'=R_6'$=—OC(=O)C($R_7'$)=CH$_2$ or H wherein $R_7'$=H; an alkyl group, substituted or unsubstituted, having 1 to 8 carbon atoms; or an aryl group, substituted or unsubstituted, having 4 to 20 carbon atoms; wherein x+y+z=n=3–9.

Formula 5 has the following structure:

wherein n=1 to 4, $R_1$=H; an alkyl group, substituted or unsubstituted, having 1 to 8 carbon atoms; or an aryl group, substituted or unsubstituted, having 4 to 20 carbon atoms; and
$R_2=R_3=R_4$=—O(CH$_2$) CH$_3$, wherein n=0 to 4;
or $R_2$, $R_3$, and $R_4$ are the same or different and are an alkyl group, substituted or unsubstituted, having 1 to 8 carbon atoms; or an aryl group, substituted or unsubstituted, having 4 to 20 carbon atoms,
or $R_2$ and $R_3$ are the same or different and=—O(CH$_2$)$_n$CH$_3$, wherein n=0 to 4, and $R_4$ is an alkyl group, substituted or unsubstituted, having 1 to 8 carbon atoms; or an aryl group, substituted or unsubstituted, having 4 to 20 carbon atoms,
or $R_2$=—O(CH$_2$)$_n$CH$_3$ wherein n=0 to 4, and $R_3$ and $R_4$ is an alkyl group, substituted or unsubstituted, having 1 to 8 carbon atoms; or an aryl group, substituted or unsubstituted, having 4 to 20 carbon atoms.

The light harvesting dye can be a compound or a mixture of two or more dye compounds. The dye compounds must, however, contain at least one of the following structures, labeled as Formulas 6 and 7.

Formula 6 has the following structure:

wherein $R^1$, $R^2$, $R^3$, $R^4$, $R^5$, $R^6$, $R^7$, $R^8$ is an H, $R^9$, or X;
$R^9$ is an alkyl group, substituted or unsubstituted, having 1 to 8 carbon atoms, or an aryl group, substituted or unsubstituted, having 4 to 20 carbon atoms; and
X is a halogen.

And Formula 7 has the following structure:

wherein $R^1$, $R^2$, $R^3$, $R^4$, $R^5$, $R^6$, $R^7$, $R^8$ is an H, $R^9$, or X;
$R^9$ is an alkyl group, substituted or unsubstituted, having 1 to 8 carbon atoms, or an aryl group, substituted or unsubstituted, having 4 to 20 carbon atoms; and
X is a halogen.

Figure 2:
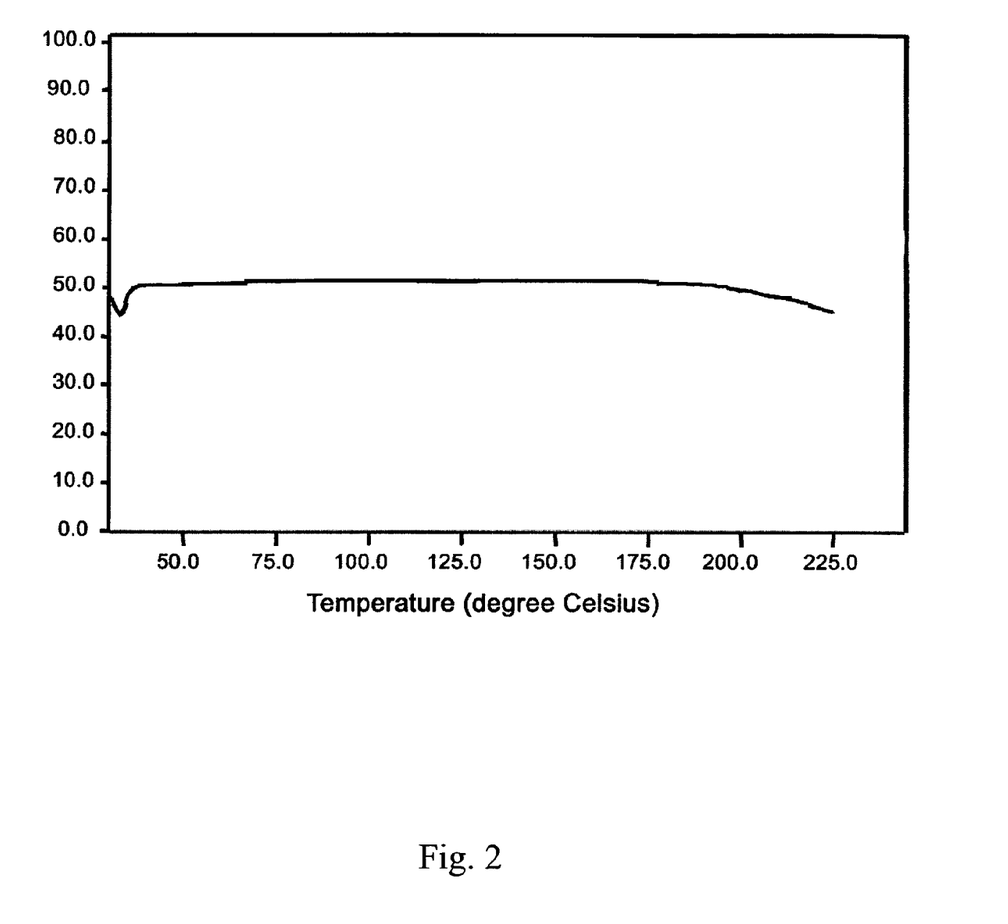
FIG. 2 is the Differential Scanning Calorimetry (DSC) spectrum of a HRM material containing about 50% MMA and about 50% of a mixture of TMPTMA and TMPTA showing the material's high thermal stability.

When the acrylate materials are polymerized, the polymerized acrylate remains thermally stable at elevated temperatures (about 170° C.)(see FIG. 2), inert toward common chemicals, and is hard and light sensitive.

The acrylate materials form a polymer matrix by a free radical polymerization. For this invention to perform as desired, each "at least two distinctive polymerizable acrylic materials" must be distinctive, as defined above. Accordingly, the acrylate materials can be selected from the monoacrylic monomers of Formula 1, the diacrylic monomers represented by Formula 2, or the triacrylic monomers represented by Formulas 3 and 4, or the silylmethacrylate monomers of Formula 5, or any combination thereof. Exemplary monomers are those illustrated in Formulas 8 to 12. These Formulas are as follows:

Formula 8 is methyl methacrylate and has the following structure:

Formula 9 is 1,2-ethanediol dimethacrylate (EGDM) and has the following structure:

Formula 10 is trimethylolpropane trimethacrylate (TMPTMA) and has the following structure:

Formula 11 is trimethylolpropane ethoxylate triacrylate (TMPETA) and has the following structure:

$x + y + z = n = 7$

Formula 12 is trimethylolpropane propoxylate triacrylate (TMPPTA) and has the following structure:

$x + y + z = n = 6$

Formula 13 is 3-(trimethoxysilyl)propylmethacrylate (TM-SPMA) and has the following structure:

Whichever two or more distinct acrylate monomers are selected, the preferred ratio between the "at least two distinctive acrylate monomers" ranges from about 1:99 percent by weight to about 99:1 percent by weight, and the preferred range is between about 5:95 and about 95:5 weight percent. This mixture of "at least two distinctive acrylate monomers" dissolves the "at least one light harvesting dye." The quinone-type photoreactive dye material is selected from the Formulas 6 and 7, or any combination thereof. The dye material has one of the following formulas.

Formula 14 is 9,10-phenanthrenequinone and has the following structure:

Formula 15 is 2-methyl-9,10-phenanthrenequinone and has the following structure:

Formula 16 is 2,7-dimethyl-9,10-phenanthrenequinone and has the following structure:

Formula 17 is 4,5-dimethyl-9,10-phenanthrenequinone and has the following structure:

Formula 18 is 2,4,5,7-tetramethyl-9,10-phenanthrene-quinone and has the following structure:

Formula 19 is 4H-cyclopenta[def]phenanthrene-8,9-dione and has the following structure:

Formula 20 is 4,4-dimethylcyclopenta[def]phenanthrene-8,9-dione and has the following structure:

The concentration of the light harvesting dye in the monomer mixture is less than 6 weight percent of the monomer mixture and greater than 0.01 weight percent of the monomer mixture. Depending upon the desired thickness of the final HRM, between 0.1 and 5 weight percent of the monomer mixture is light harvesting dye.

The HRM of the present invention therefore consists of a polymer host matrix composed of fully polymerized acrylic monomers hosting quinone-type photoreactive dyes (QS). Upon the formation of an interference pattern within the HRM by, for example, interacting laser beams, the QS is photoexcited and reactively bonds with the polymerized matrix, thereby changing its molecular polarizability and, thus, the average index of refraction of the exposed regions of the HRM. This light induced refractive index modulation forms a phase hologram within the material. The photoreaction alters the structure of the QS molecule, and the resulting photoproduct's absorption profile has a blue shift.

Figure 1:
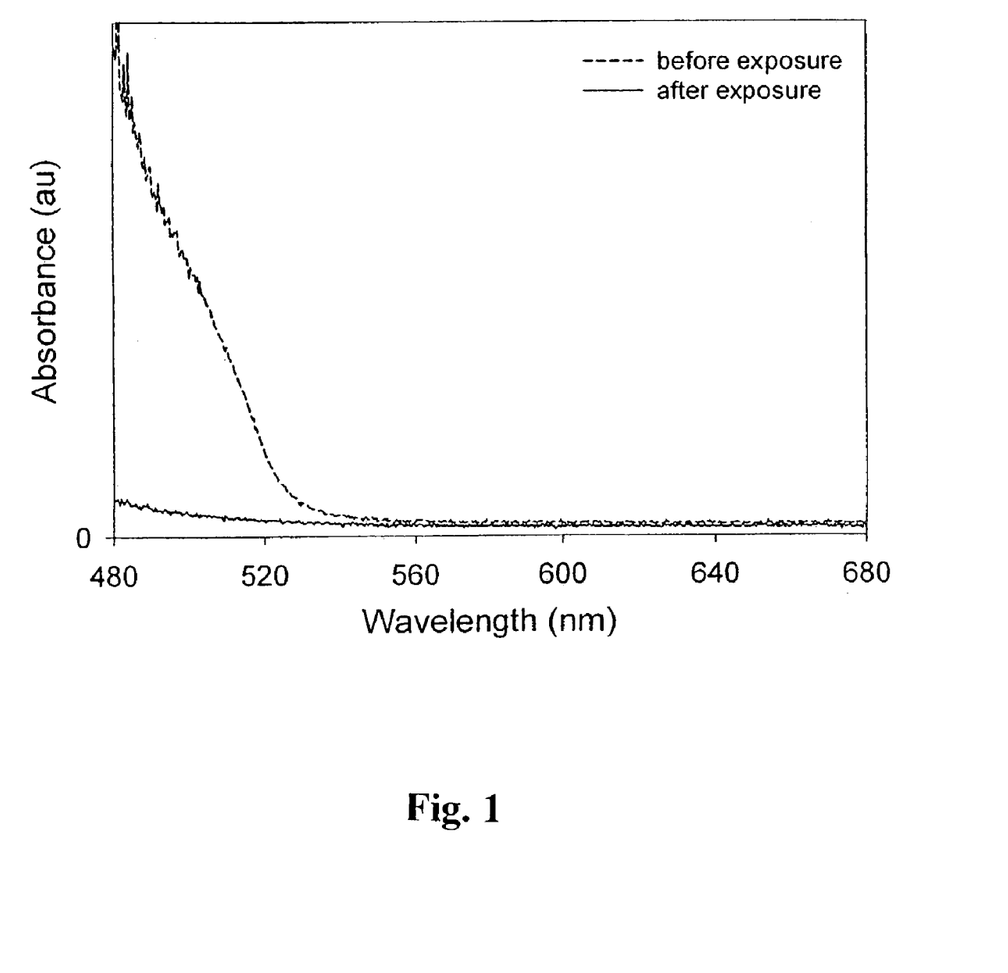
FIG. 1 is the absorbance spectra of a material prepared according to the invention before and after exposure to excitation radiation.

FIG. 1 depicts UV-Vis spectra of a 1.8 mm thick HRM according to the invention both unexposed (dashed line) and exposed to incandescent light. FIG. 1 clearly shows that the absorption of unexposed HRM extends well beyond 500 nm, while exposed HRM is basically transparent at any wavelength longer than 500 nm. It is evident that, upon exposure to light, a photoreaction of the light harvesting dye takes place whose effect is a permanent change of the dye's chemical structure resulting in a dramatic change of its absorption profile.

After the holographic grating is recorded, the strength of the grating may be increased by redistributing unreacted QS through diffusion by exposure to elevated temperature (up to 100° C.). This process is called diffusion amplification. Diffusion amplification works because the exposed QS is reactively bound to the polymerized matrix and is therefore unable to diffuse through the matrix upon exposure to elevated temperatures. Unlike unreacted QS which does diffuse through the polymerized matrix at elevated temperatures.

Figure 3:
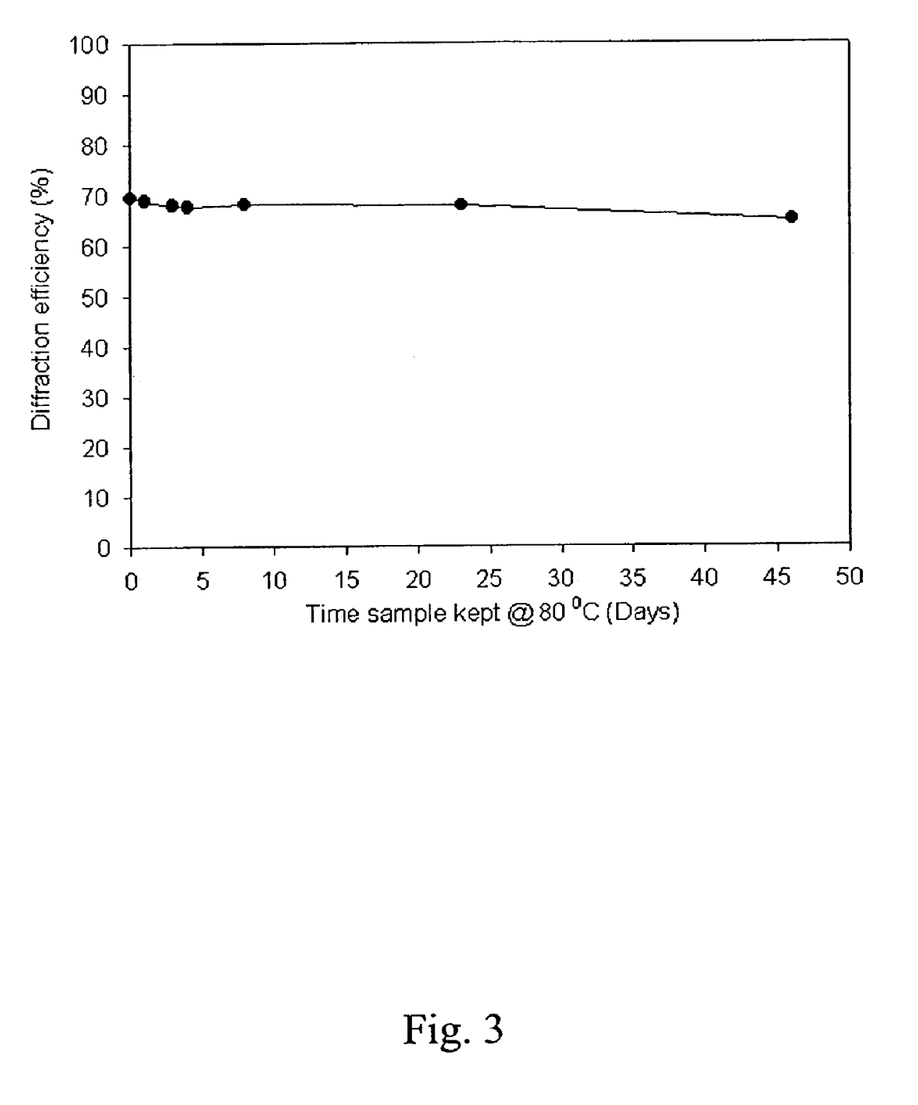
FIG. 3 is a graphical representation of the changes in diffraction efficiency of a transmission grating recorded in HRM material of this invention as a function of time.

The resistance of the exposed QS in the polymerized matrix to thermal diffusion is demonstrated in FIG. 3 which is a graphical representation of the changes in diffraction efficiency of a transmission grating recorded in HRM material of this invention as a function of time when sample was held at 80° C. Measurements of diffraction efficiency were taken at room temperature. No significant changes are observed indicating very low mobility of the photoproducts.

Although not wishing to be limited to any theories, it is believed by the inventors that the following reaction mechanisms are a representation of a possible light induced reaction between, for example, 9,10-phenanthrenequinone dye and methacrylate polymer chain. The mechanisms are described in O. W. Bandyuk, N. S. Shelekhov, A. P. Popov, M. Ya. Danilova, *Zhurnal prikladnoi khimii*, 4, 946 (1988).

One of the possible reaction schemes between QS and an acrylic type molecule is where a hydrogen atom either from the methyl methacrylate ester group or from the alkyl group is transferred to, for example, one of 9,10-phenantherene-quinone (PQ) carbonyl groups to form a hydroxyl group and a covalent bond between the other PQ's oxygen atom and a carbon atom of the ester group is formed. It is our understanding that, upon exposure to laser radiation, the PQ molecules are excited to their first singlet state, $(PQ^1)^*$, followed by a non-radiative transition of the molecule to its lowest triplet state, $(PQ^3)^*$:

$$(PQ^1)+h\nu \rightarrow (PQ^1)^* \rightarrow (PQ^3)^*$$

The highly reactive $(PQ^3)^*$ species undergo reaction with the polymer, MH, giving rise to the formation of the primary photoproducts in the form of free radicals, $H(PQ)^*$ and $M^*$. When two laser beams are intersecting in the material, then reaction of these free radicals with the polymer matrix generates a latent image in accordance with the spatial variation of the interacting laser beams. The primary photoproducts then react together to form the final photoproduct, $H(PQ)M$, which is accompanied by a change in its polarizability and hence the modulation of refractive index).

$$(PQ^3)^*+MH \rightarrow H(PQ)^*+M^* \rightarrow (PQ)^*+M^* \rightarrow H(PQ)M$$

The created phase grating can be further amplified by the thermal treatment during which the migration and redistribution of the unreacted PQ molecules eliminates a competing grating attributed to the distribution of unreacted dye (diffusion amplification).

The loss of electron delocalization due to formation of two sigma bonds is reflected in a dramatic decrease of absorption in the visible, as shown in FIG. 1, as well as small decrease in index of refraction. This permanent change of the refractive index allows recording of phase holographic gratings.

It is believed that the information contained in FIGS. 1 and 3 clearly demonstrates that the QS of the HRM of the present invention is not in the same chemical structure after exposure to excitation radiation as it was before exposure to the radiation.

Turning to the methods to prepare a HRM, the present invention sets forth three methods. Each method is a free-radical polymerization of the two distinctive acrylate materials. The polymerization can be accomplished by adding a polymerization initiator or a mixture of thermally activated polymerization initiators to the monomer mixture. Examples of a polymerization initiator are benzoyl peroxide, lauroyl peroxide, 2,2'-azobis(2-methylpropionitrile) (AIBN), 1,2-di(tbutylperoxy)cyclohexane and t-butyl peracetate. The initiator concentration ranges between up to 1 percent by weight of the monomer mixture, preferably between 0.2 to 1 percent.

First Method:

The first method is directed to producing an HRM with a uniform distribution of dye. This method requires inserting an HRM Mixture within a polymerization cell. An HRM Mixture has the monomer mixture of at least two distinct acrylate materials, the polymerization initiator, and one or more light harvesting dyes. The polymerization cell is two sheets of glass, preferably of optical flatness, separated by a gasket. The gasket is flexible and contains the HRM mixture between the sheets of glass. The polymerization cell is held together by a force, like a clamp.

Once the HRM Mixture is within the polymerization cell, the HRM Mixture is polymerized. The polymerization occurs at different temperatures during various time periods. For example, the temperature is typically held between the ranges of 60° C. to 170° C., and every temperature in between. If the temperature is at 60° C., the polymerization is not as complete as if the temperature were 170° C. Moreover, the time period can range from 2 hours to 24 hours, and every period of time in between. Accordingly, if the temperature is low and the time period is short, then the polymerization of the HRM material is not as complete as if the temperature was high and the time period long.

To obtain a hard, stable HRM, with a uniform distribution of dye throughout the HRM, the HRM Mixture is polymerized at a high temperature and a long time period.

Second Method:

The second method is directed to a non-uniform distribution of the dye throughout the HRM. This method was disclosed and claimed in U.S. application Ser. No. 09/415,984, filed Oct. 12, 1999, now U.S. Pat. No. 6,344,297, issued Feb. 5, 2002. To obtain this non-uniform distribution of the dye in HRM, the HRM is divided into at least three layers. The first layer is the inner layer. The inner layer is the HRM of the first method, except the HRM is not fully polymerized. This inner layer is then inserted into a polymerization cell, wherein there are cavities between the exterior surface of the inner layer and the polymerization cell. A third acrylate material is inserted into each cavity to form outer layers. The third acrylate material can be any monomer or combination of monomers used in the "at least two distinctive acrylate materials" of the inner layer. Moreover, the third monomer can be the same or different monomer as the "at least two distinctive acrylate materials."

Like the first method, the polymerization process occurs in the same manner to provide at the end of the process a fully polymerized HRM. The only difference is that the dye is not uniformly distributed throughout the HRM. Rather the dye is eventually distributed into a symmetrical concentration distribution, approximating an exponential distribution, wherein the concentration of the dye is greatest in the center of the HRM and the least concentrated at the edges.

Third Method:

The third method is a variation of the first and second methods. The third method has two outer layers and an inner layer. The two outer layers comprise at least one monomer selected from the above-identified acrylate materials, and a polymerization initiator. The outer layers are formed in the same steps as the inner layer of the second method (not fully polymerized).

The two outer layers are placed into a polymerization cell wherein the exterior side of each outer layer contact the interior side of the polymerization cell. Moreover, there is a cavity between the interior side of each outer layer. The HRM Mixture is inserted into the cavity. Like the first method, the polymerization process occurs in the same manner. And like the second method, the dye is distributed into a symmetrical concentration distribution, like an exponential distribution, wherein the concentration of the dye is greatest in the center of the HRM and the least concentrated at the edges of the fully polymerized HRM.

The invention may be better understood by way of the following examples which are intended to illustrate certain embodiments of the invention but not limit the scope of the claims.

EXAMPLE 1

Preparation of an HRM containing 2-methyl-9,10-phenanthrenequinone dye

A holographic recording material in the form of a disc having a diameter 5 inches and a thickness of $1/12^{th}$ inch was fabricated through the polymerization of a solution containing 216 mg of a light harvesting compound, 2-methyl-9,10-phenanthrenequinone dye in commercially available high grade methyl methacrylate (MMA) monomer in the amount of 23.2 g and 1,2-ethanediol dimethacrylate (EGDM) in the amount 7.52 g using 61.4 mg of benzoyl peroxide as the initiator inside a room, lighted of wavelengths longer than 590 nm. The monomers, preferably dry, are preferably first passed through a column with the inhibitor remover to remove the inhibitor.

A desired amount of the 2-methyl-9,10-phenanthrenequinone dye and the initiator, benzoyl peroxide, in the amount of 0.2 weight percent of the monomers is dissolved in a known amount of monomer mixture and the solution is filtered into a dust free bottle. Such prepared solution is injected into specially prepared molds. The mold consists of high quality optical glass flats separated by a flexible gasket that defines the final thickness of the material, and also forms the confining wall of the mold. The optical flats are held together in place using pressure clamps. After filling, the molds are placed in an oven at 60° C. After 24 hours temperature of the oven is raised to 90° C. and the materials are held at that temperature for 12 hours. Finally, temperature is raised to 150° C. and the material is held at this temperature for 3 hours.

EXAMPLE 2

Preparation of an HRM containing 9,10-phenanthrenequinone dye

A holographic recording material in the form of a disc having a diameter of 5 inches and a thickness of $\frac{1}{12}^{th}$ inch was fabricated through the polymerization of a solution containing 216 mg of a light harvesting compound, 9,10-phenanthrenequinone dye in commercially available high grade methyl methacrylate (MMA) monomer in the amount of 23.2 g and 1,2-ethanediol dimethacrylate (EGDM) in the amount 7.52 g using 61.4 mg of AIBN as the initiator. The solution is filtered and injected into the molds and kept for polymerization at 60° C. in an oven. The polymerization mold is as described in the Example 1. The subsequent thermal processing is as in Example 1.

EXAMPLE 3

Preparation of a Highly Crosslinked HRM

A trifunctional methacrylate monomer, trimethylolpropane trimethacrylate (TMPTMA) is used along with MMA to form highly crosslinked holographic recording material containing the light harvesting dye 9,10-phenanthrenequinone. A holographic recording material in the form of a disc of diameter 5 inches and thickness $\frac{1}{12}^{th}$ of an inch was fabricated through the polymerization of a solution containing 216 mg of a light harvesting compound, 9,10-phenanthrenequinone dye in commercially available high grade methyl methacrylate (MMA) monomer in the amount of 23.2 g and cross-linking monomer trimethylolpropane trimethacrylate (TMPTMA) in the amount 7.52 g using 61.4 mg of benzoyl peroxide as the initiator.

The fabrication procedure used for the TMPTMA crosslinked material is similar to that described in Example 1 except that the crosslinked materials are additionally processed at temperature of 170° C. for 3 hours to complete the cross-linking process. The fully crosslinked materials are thermally very stable, are scratch resistant and resistant to most organic solvents.

EXAMPLE 4

Preparation of High Sensitivity HRM

A commercially available triacrylate monomer, trimethylolpropane ethoxylate triacrylate (TMPETA), and methyl methacrylate in a weight ratio 25% to 75% were used to fabricate high sensitivity holographic recording materials. A high sensitivity HRM of diameter 5 inches and thickness $\frac{1}{12}^{th}$ of an inch was made by polymerizing mixture of 7.52 g of TMPETA triacrylate monomer and 23.2 g of methyl methacrylate monomer containing 216 mg of 9,10-phenanthrenequinone dye. The amount of benzoyl peroxide initiator is 0.2% by weight of the monomer mixture. Polymerization process is as described in Example 3.

EXAMPLE 5

Preparation of Apodized HRM

The apodized HRM (medium with symmetric concentration distribution of the dye) was created by introducing a gradient, preferably exponential, distribution in the concentration of the light harvesting dye in the polymer matrix. The concentration of the light harvesting dye molecules was maximum midway through the material's cross-section and slowly decreased to zero on either surface.

Partially polymerized sheets of methyl methacrylate based polymer having a thickness of 1.5 mm were prepared using cast polymerization of methyl methacrylate monomer, preferably dry, and benzoyl peroxide at a concentration of 0.2 weight percent at 60° C. for 12 hours in an oven. Partially polymerized polymer was removed from the polymerization cell and 5" discs were cut out. A new polymerization cell was formed between two 5" diameter polymer discs using a flexible gasket in the form of an O-ring. The material cell was firmly secured between two optical flats. The cavity between the polymer sheets was filled with a solution containing 216 mg of the light harvesting dye 9,10-phenanthrenequinone in 30.64 g of MMA monomer, preferably dry, containing 61.7 mg of benzoyl peroxide as initiator. The whole assembly was held between two aluminum plates under pressure using a pneumatic device and transferred into an oven preheated to 60° C. The material was allowed to polymerize at 60° C. for 24 hours followed by another 24 hours at 90° C. During the polymerization process, the inner walls of the polymer sheets begin to swell when they come in contact with the solution of the light harvesting dye in monomer allowing the light harvesting dye molecules to diffuse into the pure polymer sheets. As the polymerization progresses, diffusion of the light harvesting dye molecules into the polymer matrix slows down. This created an exponentially decreasing concentration of the light harvesting dye molecules from the center of the material towards the both outer surfaces.

EXAMPLE 6

Preparation of Apodized HRM 216 mg of the light harvesting dye 9,10-phenanthrenequinone and 92.6 mg of benzoyl peroxide as polymerization initiator were dissolved in 30.64 g of MMA monomer, preferably dry. The solution was filtered and used to fill the polymerization cell described in Example 1. The polymerization was carried out in an oven at a temperature of 60° C. for 24 hours and at 90° C. for 24 hours. Materials were removed from the cells at room temperature and used to form new polymerization cells. They were formed between the above materials and the optical quality glass flats of similar dimensions on either side of the doped polymer material using 3 mm thick flexible gasket as a spacer so that the doped polymer sheet was in the middle of the assembly. The cavity on either side of the polymer was filled with MMA monomer, preferably dry, containing 0.2% by weight of benzoyl peroxide polymerization initiator. The whole arrangement was then held between aluminum plates under pressure and kept in a preheated oven at 60° C. for polymerization. During polymerization, the light harvesting dye diffused from the doped inner polymer layer into monomer layers on both sides of the doped polymer sheet to form the final material with an exponential distribution of the light harvesting dye across the thickness of the material. The polymerization procedure for the preparation of the material was as described in Example 5.

EXAMPLE 7

Preparation of High Sensitivity HRM Containing Silylmethacrylate

A commercially available triacrylate monomer, trimethylolpropane triacrylate (TMPTA), trimethacrylate monomer, trimethylolpropane trimethacrylate (TMPTMA), 3-(trimethoxysilyl)propylmethacrylate (TMSPMA) and methyl methacrylate in weight percent proportions of, respectively, 10%, 10%, 16% and 64% were used to fabricate high sensitivity holographic recording materials. A high sensitivity HRM of diameter 5 inches and thickness $1/12^{th}$ of an inch was made by polymerizing mixture of 7.36 g of TMPTA triacrylate monomer, 7.49 g of TMPTMA trimethacrylate monomer, 11.55 g of TMSPMA methoxysilyl methacrylate monomer and 46.08 g of methyl methacrylate monomer containing 216 mg of 9,10-phenanthrenequinone dye. The amount of benzoyl peroxide, lauroyl peroxide and t-butyl peracetate initiators is, respectively, 0.3%, 0.1% and 0.07% by weight of the monomer mixture. Polymerization process was carried out for 10 hrs at 65° C., 4.5 hrs at 90° C. and 4.5 hrs at 135° C.

EXAMPLE 8

Preparation of Highly Crosslinked HRM

A trifunctional methacrylate monomer, trimethylolpropane trimethacrylate (TMPTMA) is used along with MMA to form highly crosslinked holographic recording material containing the light harvesting dye 9,10-phenanthrenequinone. A holographic recording material in the form of a disc of diameter 5 inches and thickness $1/12^{th}$ of an inch was fabricated through the polymerization of a solution containing 216 mg of a light harvesting compound, 9,10-phenanthrenequinone dye in commercially available high grade methyl methacrylate (MMA) monomer in the amount of 23.2 g and cross-linking monomer trimethylolpropane trimethacrylate (TMPTMA) in the amount 7.52 g using 61.4 mg of benzoyl peroxide and 21 mg of t-butyl peracetate as the initiator mixture.

The fabrication procedure used for the TMPTMA crosslinked material is as that described in Example 7. The fully crosslinked materials are thermally very stable, are scratch resistant and resistant to most organic solvents.

EXAMPLE 9

Preparation of HRM Containing Silylmethacrylate

A mixture of 33 gm of 3-(trimethoxysilyl)propyl methacrylate, TMSPMA, 13 gm MMA and 12 gm of acidified (0.02 N HCl) water and sonicated with a high intensity ultrasonic horn in an ice bath for (i) 2 hrs followed with stirring for 12 hrs in order to hydrolyze alkoxy groups and condense silyloxy groups to form a silica network. Other methods of hydrolysis and condensation are known in the art and can be used. Such methods are described in, for example, "Sol-Gel Science. The physics and Chemistry of Sol-Gel Processing", by C. Jeffrey Brinker and George W. Scherer, Academic Press, San Diego 1990, and in "Organic/Inorganic Hybrid Materials" ed. by Richard M. Laine, Clement Sanchez, C. Jeffrey Brinker and Emmanuel Giannelis, MRS Symposium Proceedings vol. 519, 1998. A flask of a rotary evaporator was filled with the above mixture and water and methyl alcohol were distilled off at 60° C. under reduced pressure. From the remaining 34 g of the reaction products, 4 g was taken and mixed with a commercially available triacrylate monomer, trimethylolpropane triacrylate (TMPTA), trimethacrylate monomer, trimethylolpropane trimethacrylate (TMPTMA) and methyl methacrylate in a weight percent proportions of, respectively, 13%, 13%, and 74%. A high sensitivity HRM of diameter 5 inches and thickness $1/12^{th}$ of an inch is made by polymerizing mixture of 4 g of hydrolyzed and condensed TMSPMA, 8.5 g of TMPTA triacrylate monomer, 8.5 g of TMPTMA trimethacrylate monomer, and 49.02 g of methyl methacrylate monomer containing 216 mg of 9,10-phenanthrenequinone dye. The amount of lauryl peroxide, benzoyl peroxide and t-butyl peracetate initiators is, respectively, 0.26%, 0.13 and 0.07% by weight of the monomer mixture. Polymerization process is as described in Example 7.

EXAMPLE 10

Preparation of HRM Containing Silylmethacrylate Hydrolyzed with Base Catalyst The polymerized HRM was prepared as described in Example 9 except that the initial mixture containing TMSPMA silyl compound was hydrolyzed using base catalyst as follows: A mixture of 33 gm of TMSPMA and 13 gm MMA and 8 gm of base containing water (0.01 N NH$_4$OH) was sonicated with a high intensity ultrasonic horn in an ice bath for (i) 2 hrs followed with stirring for 12 hrs.

It will be understood that various modifications may be made to the embodiments disclosed herein. For example, other polymerization initiators may be used to initiate polymerization of the acrylate monomers. Therefore, the above description should not be construed as limiting, but merely as exemplifications of preferred embodiments. Those skilled in the art will envision other modifications within the scope and spirit of the claims appended hereto.

What is claimed is:

1. A holographic recording material comprising:
   at least two distinctive polymerizable acrylic materials, each distinctive polymerizable acrylic material having a secondary carbon chain of a different length, wherein the polymerizable acrylic materials are thermally polymerized; the polymerized acrylic material is thermally stable; and
   a dye selected from the group consisting of:

and mixtures thereof;

wherein $R^1$, $R^2$, $R^3$, $R^4$, $R^5$, $R^6$, $R^7$, $R^8$, is H, an alkyl group having 1 to 8 carbon atoms, an aryl group having 4 to 20 carbon atoms, or a halogen.

2. The holographic recording material of claim 1 wherein at least two distinctive polymerizable acrylic materials are selected from the group consisting of compounds having the following structural formulas:

[I]

wherein R'=H, an alkyl group having 1 to 8 carbon atoms, or an aryl group having 4 to 20 carbon atoms;
R=an alkyl group having 1 to 8 carbon atoms or an aryl group having 4 to 20 carbon atoms; and
n=0 to 8, and when X is present,
X is S or O;

[II]

wherein R=an alkyl group having 1 to 8 carbon atoms or an aryl group having 4 to 20 carbon atoms;
$R_1''$ and $R_2''$ independently=—OC(=O)C($R_3$)=$CH_2$ or H, wherein $R_3$=H, an alkyl group having 1 to 8 carbon atoms or an aryl group having 4 to 20 carbon atoms;

[III]

wherein R'''=a tri- or tetra-substituted aryl group or a carbon atom, R'=H, an alkyl group having 1 to 8 carbon atoms, or an aryl group having 4 to 20 carbon atoms, or $R_9'$ and $R_{10}'$=—O($CH_2$)$_m$$CH_3$, wherein m=0 to 4, and $R_{11}'$ is an alkyl group, substituted or unsubstituted, having 1 to 8 carbon atoms; or an aryl group, substituted or unsubstituted, having 4 to 20 carbon atoms,
or $R_9'$=—O($CH_2$)$_m$$CH_3$ wherein m=0 to 4, and $R_{10}'$ and $R_{11}'$ is an alkyl group, substituted or unsubstituted, having 1 to 8 carbon atoms; or an aryl group, substituted or unsubstituted, having 4 to 20 carbon atoms.

3. The holographic recording material of claim 1 wherein the dye is selected from the group consisting of 9,10-phenanthrenequinone, 2-methyl-9,10-phenanthrenequinone, 2,7-dimethyl-9,10-phenanthrenequinone, 4,5-dimethyl-9,10-phenanthrenequinone, 2,4,5,7-tetramethyl-9,10-phenanthrenequinone, 4H-cyclopenta[def]phenanthrene-8,9-dione, 4,4-dimethylcyclopenta[def]phenanthrene-8,9-dione, and combinations thereof.

4. The holographic recording material of claim 1 wherein the dye is 9,10-phenanthrenequinone.

5. The holographic recording material of claim 1 wherein the dye is 2-methyl-9,10-phenanthrenequinone.

6. The holographic recording material of claim 1 wherein the dye is 4H-cyclopenta[def]phenanthrene-8,9-dione.

7. The holographic recording material of claim 1 wherein the dye is 4,4-dimethylcyclopenta[def]phenanthrene-8,9-dione.

8. The holographic recording material of claim 1 wherein the dye comprises of 75 to 95 weight percent of 9,10-phenanthrenequinone and 25 to 5 weight percent of 9-iodophenanthrene.

9. The holographic recording material of claim 1 wherein the ratio between each distinctive polymerizable acrylic material ranges from 1:99 to 99:1 percent by weight.

10. The holographic recording material of claim 1 wherein the polymerizable acrylic material polymerizes in a temperature range of 60° C. to 170° C.

[III]

wherein R'''=a tri- or tetra-substituted aryl group or a carbon atom, R'=H, an alkyl group having 1 to 8 carbon atoms, or an aryl group having 4 to 20 carbon atoms, $R_1'$, $R_2'$, and $R_3'$ independently=—OC(=O)C($R_4$)=$CH_2$ or H wherein $R_4$=H, an alkyl group having 1 to 8 carbon atoms, or an aryl group having 4 to 20 carbon atoms;

[IV]

wherein R'''=a tri- or tetra-substituted aryl group or a carbon atom; R'=H, an alkyl group, substituted or unsubstituted, having 1 to 8 carbon atoms, or an aryl group, substituted or unsubstituted, having 4 to 20 carbon atoms; $R_8'$=$R_9'$=$R_{10}'$ and are —$CH_2CH_2$— or —$CH_2CH_2CH_2$—, wherein $R_4'$=$R_5'$=$R_6'$ and are —OC(=O)C($R_7'$)=$CH_2$ or H; and $R_7'$=H, an alkyl group, substituted or unsubstituted, having 1 to 8 carbon atoms; or an aryl group, substituted or unsubstituted, having 4 to 20 carbon atoms; wherein x+v+z=3 to 9; and
$R_1'$, $R_2'$ and $R_3'$ independently=—OC(=O)C($R_4$)=$CH_2$ or H wherein $R_4$=H, an alkyl group having 1 to 8 carbon atoms, or an aryl group having 4 to 20 carbon atoms;

[IV]

wherein R'''=a tri- or tetra-substituted aryl group or a carbon atom; R'=H, an alkyl group, substituted or unsubstituted, having 1 to 8 carbon atoms, or an aryl group, substituted or unsubstituted, having 4 to 20 carbon atoms; $R_1'$=$R_2'$=$R_3'$ and are —$CH_2CH_2$— or —$CH_2CH_2CH_2$—, wherein $R_4'$=$R_5'$=$R_6'$ and are —OC(=O)C($R_7'$)=$CH_2$ or H; and $R_7'$=H, an alkyl group, substituted or unsubstituted, having 1 to 8 carbon atoms; or an aryl group, substituted or unsubstituted, having 4 to 20 carbon atoms; wherein x+y+z=3 to 9 and

[V]

wherein n=1 to 4, $R_8'$=H; an alkyl group, substituted or unsubstituted, having 1 to 8 carbon atoms; or an aryl group, substituted or unsubstituted, having 4 to 20 carbon atoms; and $R_9'$, $R_{10}'$ and $R_{11}'$=—O(CH$_2$)$_m$CH$_3$ wherein m=0 to 4;

or $R_9'$, $R_{10}'$, and $R_{11}'$ are the same or different and are an alkyl group, substituted or unsubstituted, having 1 to 8 carbon atoms; or an aryl group, substituted or unsubstituted, having 4 to 20 carbon atoms.

11. The holographic recording material of claim 1 wherein the dye is about 0.01 to about 5 weight percent of the acrylic material.

12. An apodized holographic recording material comprising:
at least two distinctive polymerizable acrylic materials, each distinctive polymerizable acrylic material having a secondary carbon chain of a different length, wherein the polymerizable acrylic materials are fully thermally polymerized; and
a dye selected from the group consisting of:

and mixtures thereof;
wherein $R^1$, $R^2$, $R^3$, $R^4$, $R^5$, $R^6$, $R^7$, $R^8$, is H, an alkyl group having 1 to 8 carbon atoms, an aryl group having 4 to 20 carbon atoms, or a halogen; and, wherein the dye is distributed throughout the polymerized acrylic material in a gradient distribution to provide the apodized holographic recording material.

13. The apodized holographic recording material of claim 12 wherein the gradient distribution of the dye in the polymerized acrylic material is symmetrical.

14. The apodized holographic recording material of claim 13 wherein the symmetrical distribution of the dye in the polymerized acrylic material is an exponential distribution.

15. The apodized holographic recording material of claim 12 wherein the gradient distribution of the dye in the polymerized acrylic material has a concentration maxima in an interior region of the apodized holographic recording material.

16. A method of fabricating a holographic recording medium comprising the steps of:
preparing two outer layers of at least two distinctive polymerizable acrylic materials;
positioning the outer layers, which are at least partially polmerized, between two planar plates, each outer layer is separated from the other outer layer so there is a cavity between the outer layers;
inserting into the cavity a solution comprising polymerizable acrylic material and a dye selected from the group consisting of:

and mixtures thereof;
wherein $R^1$, $R^2$, $R^3$, $R^4$, $R^5$, $R^6$, $R^7$, $R^8$, is H, an alkyl group having 1 to 8 carbon atoms, an aryl group having 4 to 20 carbon atoms, or a halogen; and, wherein the dye bonds with the polymerized acrylic material upon absorption of excitation radiation;
heating the outer layers and the solution comprising polymerizable acrylic material and dye to form, a holographic recording medium having a concentration distribution of the dye.

17. The method of claim 16 wherein the step of preparing an outer layers of at least two distinctive polymerizable materials comprises providing at least two distinctive polymerizable materials selected from the group consisting of compounds having the following structural formulas:

[I]

wherein R'=H, an alkyl group having 1 to 8 carbon atoms, or an aryl group having 4 to 20 carbon atoms;
R=an alkyl group having 1 to 8 carbon atoms or an aryl group having 4 to 20 carbon atoms; and
n=0 to 8, and when X is present,
X is S or O;

wherein R=an alkyl group having 1 to 8 carbon atoms or an aryl group having 4 to 20 carbon atoms;

$R_1''$ and $R_2''$ independently=—OC(=O)C($R_3$)=$CH_2$ or H, wherein $R_3$=H, an alkyl group having 1 to 8 carbon atoms or an aryl group having 4 to 20 carbon atoms;

wherein n=1 to 4, $R_{11}'$=H; an alkyl group, substituted or unsubstituted, having 1 to 8 carbon atoms; or an aryl group, substituted or unsubstituted, having 4 to 20 carbon atoms;

$R_{12}'$ $R_{13}'$ and $R_{14}'$=—O($CH_2$)$_m$$CH_3$, wherein m=0 to 4;

or $R_{12}'$, $R_{13}'$, and $R_{14}'$ are the same or different and are an alkyl group, substituted or unsubstituted, having 1 to 8 carbon atoms; or an aryl group, substituted or unsubstituted, having 4 to 20 carbon atoms, or $R_{12}'$ and $R_{13}'$=—O($CH_2$)$_m$$CH_3$, wherein m=0 to 4, and $R_{14}'$ is an alkyl group, substituted or unsubstituted, having 1 to 8 carbon atoms; or an aryl group, substituted or unsubstituted, having 4 to 20 carbon atoms, or $R_{12}'$=—O($CH_2$)$_m$$CH_3$ wherein m=0 to 4, and $R_{13}'$ and $R_{14}'$ is an alkyl group, substituted or unsubstituted, having 1 to 8 carbon atoms; or an aryl group, substituted or unsubstituted, having 4 to 20 carbon atoms.

18. The method of claim 16 wherein the step of inserting a solution comprising polymerizable acrylic material and a dye comprises providing at least one polymerizable acrylic material selected from the group consisting of compounds having the following structural formulas:

wherein $R'$=H, an alkyl group having 1 to 8 carbon atoms, or an aryl group having 4 to 20 carbon atoms;

R=an alkyl group having 1 to 8 carbon atoms or an aryl group having 4 to 20 carbon atoms; and n=0 to 8, and when X is present,

X is S or O;

wherein R=an alkyl group having 1 to 8 carbon atoms or an aryl group having 4 to 20 carbon atoms;

$R_1''$ and $R_2''$ independently=—OC(=O)C($R_3$)=$CH_2$ or H, wherein $R_3$=H, an alkyl group having 1 to 8 carbon atoms or an aryl group having 4 to 20 carbon atoms;

wherein $R'''$=a tri- or tetra-substituted aryl group or a carbon atom, $R'$=H, an alkyl group having 1 to 8 carbon atoms, or an aryl group having 4 to 20 carbon atoms, $R_1'$, $R_2'$, and $R_3'$ independently=—OC(=O)C($R_4$)=$CH_2$ or H wherein $R_4$=H, an alkyl group having 1 to 8 carbon atoms, or an aryl group having 4 to 20 carbon atoms;

wherein $R'''$=a tri- or tetra-substituted aryl group or a carbon atom; $R'$=H, an alkyl group, substituted or unsubstituted, having 1 to 8 carbon atoms, or an aryl group, substituted or unsubstituted, having 4 to 20 carbon atoms; $R_5'$=$R_6'$=$R_7'$ and are —$CH_2CH_2$— or $CH_2CH_2CH_2$—, $R_8'$=$R_9'$=$R_{10}'$ and are —OC(=O)C($R_{11}'$)=$CH_2$ or H; and $R_{11}'$=H, an alkyl group, substituted or unsubstituted, having 1 to 8 carbon atoms; or an aryl group, substituted or unsubstituted, having 4 to 20 carbon atoms; wherein x+y+z=3 to 9; and wherein n=1 to 4, $R_{12}'$=H; an alkyl group, substituted or unsubstituted, having 1 to 8 carbon atoms; or an aryl group, substituted or unsubstituted, having 4 to 20 carbon atoms; and $R_{13}'$, $R_{14}'$, and $R_{15}'$=—O($CH_2$)$_m$$CH_3$, wherein m=0 to 4;

or $R_{13}'$, $R_{14}'$, and $R_{15}'$ are the same or different and are an alkyl group, substituted or unsubstituted, having 1 to 8 carbon atoms; or an aryl group, substituted or unsubstituted, having 4 to 20 carbon atoms, or $R_{13}'$ and $R_{14}'$=—O($CH_2$)$_m$$CH_3$, wherein m=0 to 4, and $R_{15}'$ is an alkyl group, substituted or unsubstituted, having 1 to 8 carbon atoms; or an aryl group, substituted or unsubstituted, having 4 to 20 carbon atoms, or $R_{13}'$=—O($CH_2$)$_m$$CH_3$ wherein m=0 to 4, and $R_{14}'$ and $R_{15}'$ is an alkyl group, substituted or unsubstituted, having 1 to 8 carbon atoms; or an aryl group, substituted or unsubstituted, having 4 to 20 carbon atoms.

19. The method of claim 16 wherein the step of heating the outer layers and the solution comprising polymerizable acrylic material and a dye comprises heating to a temperature between 60° C. and 170° C.

* * * * *